United States Patent [19]

Mizuno

[11] 4,204,232
[45] May 20, 1980

[54] PATTERN TRANSMISSION SYSTEM COMPRISING AN ENCODER FOR ENCODING PARTIAL THINNED PATTERNS IN TWO SCANNING LINES ALONG ONLY ONE BOUNDARY LINE

[75] Inventor: Shoji Mizuno, Tokyo, Japan

[73] Assignee: Nippon Electric Co., Ltd., Tokyo, Japan

[21] Appl. No.: 922,701

[22] Filed: Jul. 7, 1978

[30] Foreign Application Priority Data

Jul. 8, 1977 [JP] Japan .................................. 52-82246
Jul. 8, 1977 [JP] Japan .................................. 52-82247
Jul. 21, 1977 [JP] Japan .................................. 52-88194
Dec. 20, 1977 [JP] Japan .................................. 52-153919

[51] Int. Cl.² ........................................... H04N 1/40
[52] U.S. Cl. .................... 358/260; 358/261; 364/515
[58] Field of Search ............... 358/260, 261; 364/515

[56] References Cited

U.S. PATENT DOCUMENTS

| | | | |
|---|---|---|---|
| 3,967,053 | 6/1976 | Grosskopf | 364/515 |
| 4,028,731 | 6/1977 | Arps | 358/261 |
| 4,107,648 | 8/1978 | Frank | 358/261 |
| 4,124,870 | 11/1978 | Schatz | 358/260 |
| 4,124,871 | 11/1978 | Morrin | 358/260 |

OTHER PUBLICATIONS

Stefanelli et al., "Some Practical Thinning Algorithms for Digital Pictures," Journal of the Association for Computing Machinery, vol. 18, No. 2, (Apr. 1971), pp. 255-264.
Wyle et al., "Reduced-Time Facsimile Transmission by Digital Coding," *IRE Transactions on Communications Systems*, vol. SC-9 No. 3 (Sep. 1961), pp. 215-222.

Primary Examiner—Howard W. Britton
Attorney, Agent, or Firm—Sughrue, Rothwell, Mion, Zinn and Macpeak

[57] ABSTRACT

"Black" runs thinned from a substantially two-tone original pattern and having a pattern stroke width of a substantially single picture element are classified into four states where a black run in a present scanning line is (1) linked with a leading side of black run in a next previous line, (2) linked with a trailing side of the latter, (3) aligned with the latter in both sides, and (4) not linked with the latter. The former is defined to be linked with the latter when they have either a vertex or a side of a picture element alone in common. The former is encoded according to the successively classified states by using, for states (1) and (2), a black run length. For state (4), the black run length is used in combination with a "white" run length measured up or down to the leading side of the former, if any, from the trailing side of that black run in the previous line which either next leads the former or has more common picture element side or sides than specified on defining linkage with leading and/or trailing sides staggered in relation to the corresponding sides of the former. Thinning processes are iterated preferably not transforming a "black" picture element into a "white" one when situated, in addition to known neighborhood conditions, at a vertex of an acute "black" triangle. The encoded signal is decoded and then subjected to iterative thickening processes into a reproduction approximately representative of the original.

11 Claims, 28 Drawing Figures

(a)  (b)  (c)

(d)  (e)

FIG 14
(a) (b) (c) (d) (e)
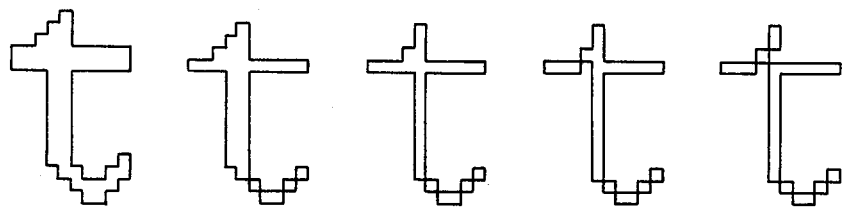
FIG 15
(d1)
| 1 | 1 | 0 |
|---|---|---|
| 0 | 1 | 0 |
| 0 | 0 | 0 |
(d2)
| 1 | 0 | 0 |
|---|---|---|
| 1 | 1 | 0 |
| 0 | 0 | 0 |
(d3)
| 0 | 1 | 1 |
|---|---|---|
| 0 | 1 | 0 |
| 0 | 0 | 0 |
(d4)
| 0 | 0 | 1 |
|---|---|---|
| 0 | 1 | 1 |
| 0 | 0 | 0 |
| 0 | 0 | 0 |
|---|---|---|
| 1 | 1 | 0 |
| 1 | 0 | 0 |
| 0 | 0 | 0 |
|---|---|---|
| 0 | 1 | 0 |
| 1 | 1 | 0 |
| 0 | 0 | 0 |
|---|---|---|
| 0 | 1 | 1 |
| 0 | 0 | 1 |
| 0 | 0 | 0 |
|---|---|---|
| 0 | 1 | 0 |
| 0 | 1 | 1 |
(d5) (d6) (d7) (d8)
FIG 16
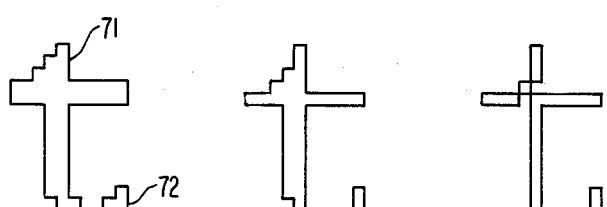
(a) (b) (c)

FIG 17
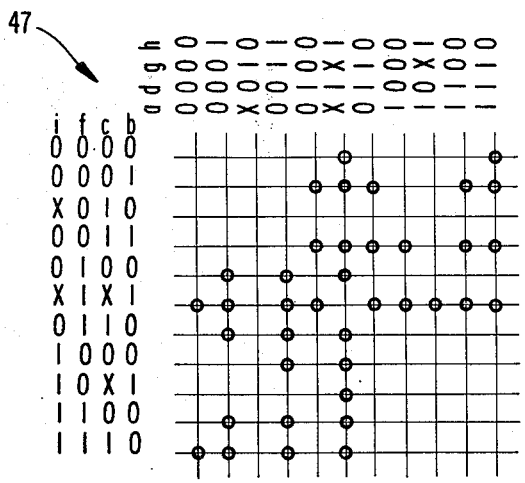
(a) 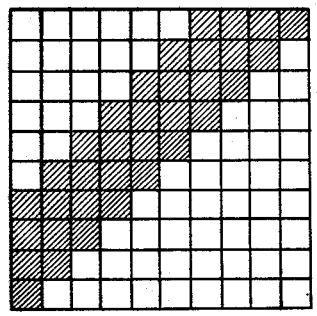 (b) 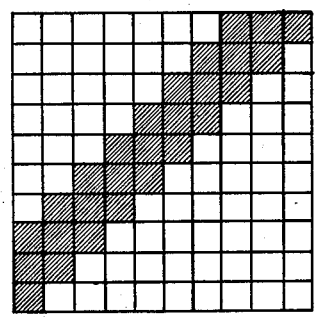 (c) 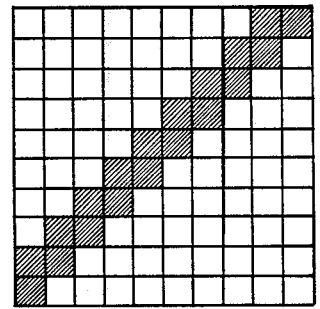
(d) 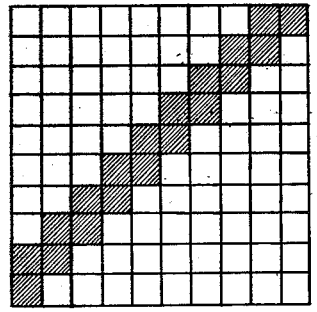 (e) 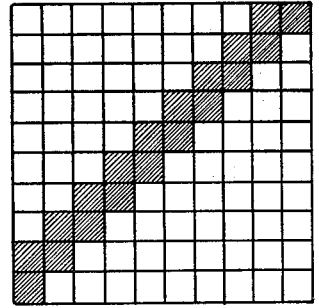
FIG 18

(a)  (b)  (c)

(d)  (e)  (f)

FIG 20
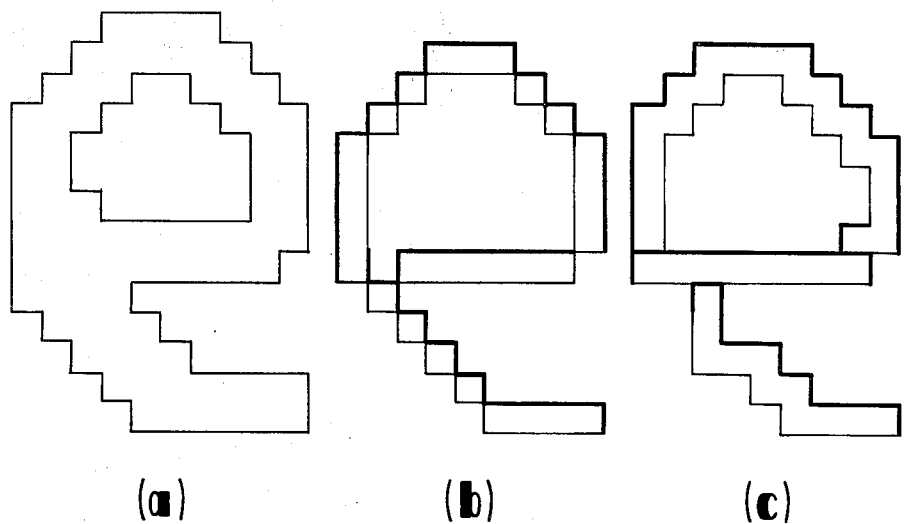
(a)  (b)  (c)
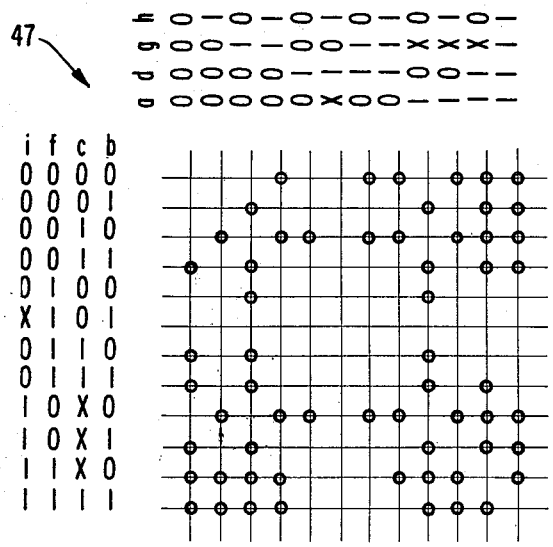
FIG 21

FIG 22
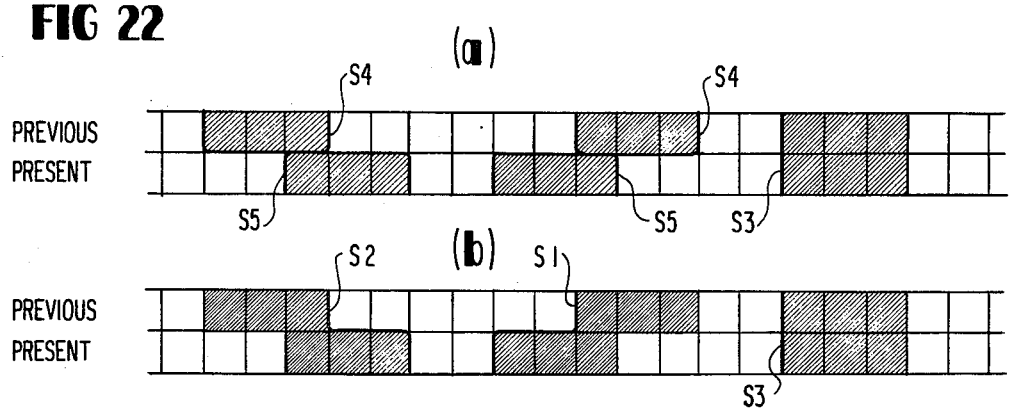
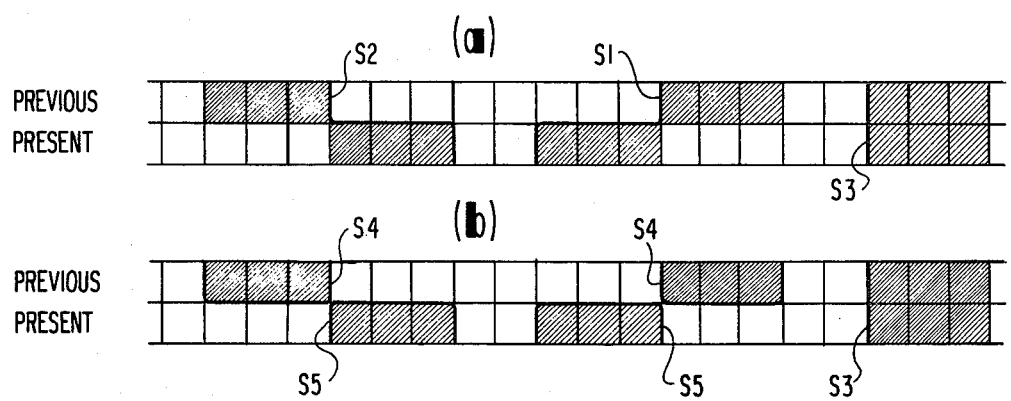
FIG 23
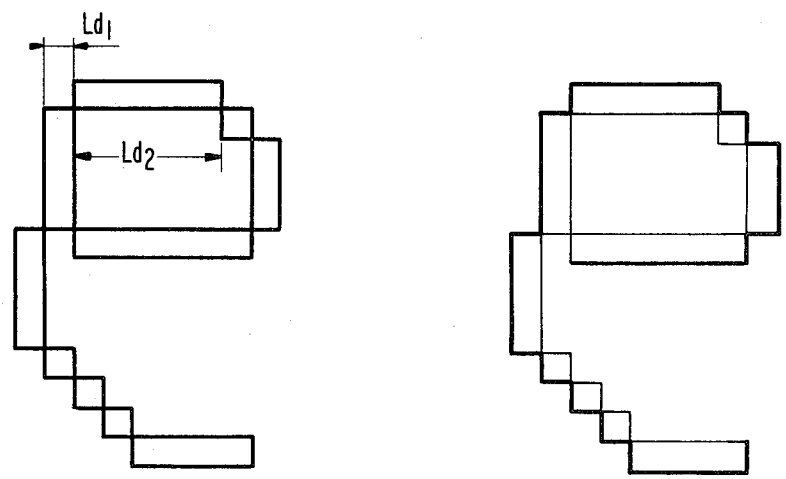
FIG 24
PRIOR ART
FIG 25

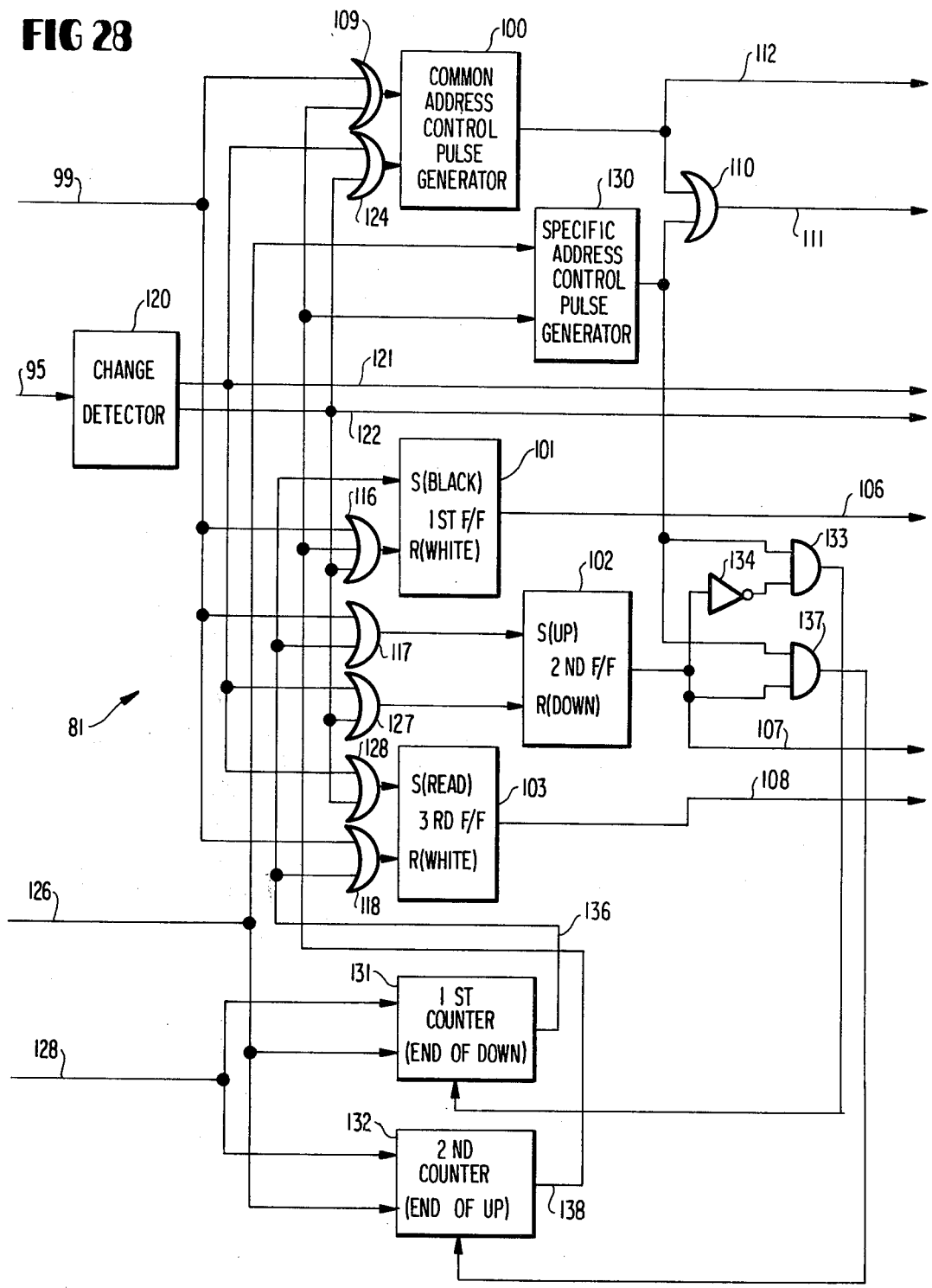

PATTERN TRANSMISSION SYSTEM COMPRISING AN ENCODER FOR ENCODING PARTIAL THINNED PATTERNS IN TWO SCANNING LINES ALONG ONLY ONE BOUNDARY LINE

BACKGROUND OF THE INVENTION

This invention relates to a system for transmitting a pattern or picture. The system is well applicable to a facsimile transmission system.

It is usual in such a system to encode an original pattern by an encoder into an encoded signal by making use of correlation between successive picture information pieces with a view to compressing the signal bandwidth or the amount of the signal to be transmitted from a transmitter to a receiver. It has been intended that the original pattern encoded and transmitted to the receiver by reproduced into a faithful reproduction of the original pattern. It is, however, often desirable as in transmitting hand-printed letters to achieve a higher compression ratio even at the sacrifice of the faithfulness of the reproduced pattern.

It is also known to derive a thinned pattern representative of a skelton or a medial line of the original pattern in order to reduce the amount of the signal to be transmitted. Both boundary lines of the thinned pattern have been encoded into run length codes by an encoder of a conventional pattern transmission system. On the other hand, it is often objectionable that the thinned pattern is considerably unfaithfully representative of the original pattern. This is particularly the case when the original pattern is divided, on encoding, into picture elements with a low resolving power.

SUMMARY OF THE INVENTION

It is therefore an object of the present invention to provide a system for transmitting an original pattern with a high efficiency of signal bandwidth compression.

It is another object of this invention to provide a system of the type described, in which a reproduced picture is rendered appreciably faithfully representative of the original pattern.

According to this invention, there is provided a system for transmitting an original pattern printed with an original pattern width on a surface of a pattern carrying medium and with a first area left on the surface as a background of the original pattern. The original pattern and the first area are substantially of a first and a second tone, respectively. The system comprises sampling means supplied with the pattern carrying medium for sampling picture elements from the original pattern and the first area substantially along rectilinear and parallel scanning lines covering the surface in succession. Each of the picture elements has four substantially equal sides and four vertices. The picture elements in the successive scanning lines are arranged substantially along straight lines that transversely cross the scanning lines. Each of the scanning lines has a leading and a trailing end. The original pattern width is generally of at least two picture elements. The sampling means thereby produces electrical signals successively representative of the picture elements and having a first and a second level when the picture elements are of the first and the second tones, respectively. The system further comprises thinning means responsive to the electrical signals for thinning the original pattern into an eventually thinned pattern, with the first area accordingly widened into a second area serving in effect as a background of the thinned pattern, in accordance with a predetermined law as regards positional relations between each of the first-tone picture elements and the neighboring picture elements. The thinned pattern has a thinned pattern width of a substantially single picture element and is composed of partial patterns, each having a leading and a trailing side in one of the scanning lines. The leading and the trailing sides are nearer to the leading and the trailing ends of that one scanning line, respectively. The thinning means thereby produces a pre-processed signal representative of the thinned pattern and the second area. The system still further comprises classifying means responsive to the pre-processed signal for successively classifying spatial relationships between a first of the partial patterns in a first of the scanning lines and a second partial pattern adjacent to the first partial pattern in a second scanning line next preceding in the succession the first scanning line into a first state in which the first partial pattern is connected with the leading side of the second partial pattern, a second state in which the first partial pattern is connected with the trailing side of the second partial pattern, a third state in which the first and the second partial patterns have aligned leading and trailing sides, and a fourth state in which the first and the second partial patterns have other spatial relationships. The classifying means thereby produce a discrimination signal specifying the successively classified states. The system yet further comprises encoding means responsive to the pre-processed and the discrimination signals for encoding the first partial pattern with reference to the classified state. The encoding means thereby produces a band-compressed signal representative of the original pattern.

Brief Description of the Drawing

FIG. 14 is for describing that sequence of thinning processes which are not always preferred;

FIG. 15 shows matrices of picture elements for use in describing a thinning circuit of a pattern transmission system according to a second embodiment of this invention;

FIG. 16 is for describing an improved series of thinning processes carried out by a thinning circuit in which use is made of the picture element matrices depicted in FIGS. 7 and 15;

FIG. 17 shows a read-only memory used in the thinning circuit mentioned in connection with FIGS. 15 and 16;

FIGS. 18 and 19 are for describing thinning processes carried out by a thinning circuit of a pattern transmission system according to a third embodiment of this invention;

FIG. 20 shows an original pattern and eventually thinned patterns obtained by thinning circuits of pattern transmission systems according to the first or the second embodiments and according to the third embodiment, respectively;

FIG. 21 shows a read-only memory for use in the thinning circuit mentioned in conjunction with FIGS. 18 and 19;

FIGS. 22 and 23 show a few examples of partial patterns of thinned patterns for describing encoding processes carried out by an encoding circuit of a pattern transmission system according to the third embodiment;

FIG. 24 illustrates encoding processes carried out by an encoding circuit of a conventional pattern transmission system;

FIG. 25 is for describing technical merits achieved by a pattern transmission system according to this invention;

FIG. 28 is a block diagram of a first state decoder of the decoding circuit depicted in FIG. 27.

DESCRIPTION OF THE PREFERRED EMBODIMENTS

Figure 1:
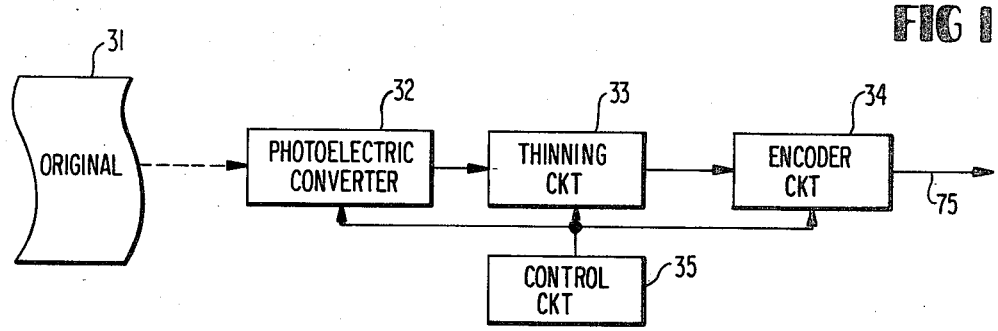
FIG. 1 is a block diagram of an encoding device of a pattern transmission system according to the instant invention.

Referring to FIG. 1, a pattern encoding device of a pattern transmission system according to this invention will be described as applied to a facsimile transmitter for an original document or copy 31 that is fed relative to the encoding device and has a certain document width transversely of the direction of feed. An original pattern or picture, such as letters, is printed on a surface of the document 31 with an original pattern width (the width of a stroke in a pattern being referred to as "pattern width" merely for brevity) that may be variable from a portion of the original pattern to another portion. A first area of the document surface is left as a background of the original pattern. The document 31 is either electrically or mechanically scanned (main scan) by a known phtoelectric converter 32 of the encoding device. It is presumed without loss of generality that the document 31 is fed from bottom to top and scanned from left to right in the drawing. The document 31 is thus covered by a raster of successive scanning lines. As a result of the relative feed and the scan, the original pattern and the background are sampled into samples or picture elements, such as substantially black and white picture elements, represented by pulse signals of a first and a second level. When the original pattern is of more than one tone, it should be understood that the converter 32 is accompanied by a color filter (not shown). The picture elements are of a size such that the original pattern width is generally represented by at least two picture elements. When very high resolution is desired, each letter is sampled into about (47×64) picture elements together with the background. It is, however, general in facsimile transmission and reception to resolve each letter and the background into about (12×18) picture elements, or about (8×8) picture elements per square millimeter. At any rate, it is surmised that the white and the black picture elements are represented by logic "0" and logic "1" pulses, respectively. The converter 32 thus produces a sequence of logic "0" and "1" pulses.

Further referring to FIG. 1, the encoding device comprises a thinning circuit 33 for repeatedly carrying out thinning processes to convert the pulse sequence to a pre-processed pulse or signal sequence representative of an eventually thinned pattern and a second area that serves in effect as a background of the thinned pattern. The thinned pattern has a thinned pattern width of a substantially single picture element. The encoding device further comprises an encoding circuit 34 for converting the pre-processed pulse sequence to an encoded or band-compressed signal representative in effect of the original pattern. The thinning and the encoding circuits 33 and 34 will be described later. The encoding device still further comprises a control circuit 35 for supplying the converter 32, the thinning circuit 33, and the encoding circuit 34 with control and synchronizing signals. For example, the control circuit 35 supplies the converter 32 with a sequence of timing pulses so as to enable the latter produce the logic pulse sequence in synchronism therewith. It may be mentioned here that the picture elements in the successive scanning lines are usually arranged along straight lines perpendicularly crossing the scanning lines. Each picture element has four substantially equal sides and four vertices even though the picture elements may be of a rectangular or a parallelogram in shape.

Figure 2:
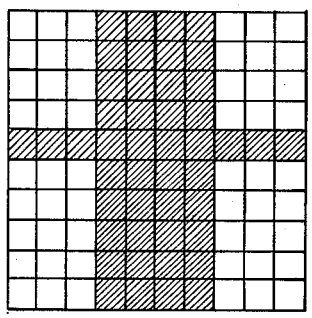
FIGS. 2 through 5 are for describing thinning processes carried out by a thinning circuit of a pattern transmission system according to a first embodiment of this invention.
Figure 2:
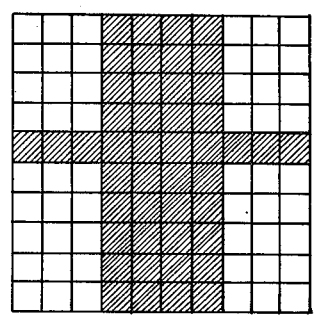
Figure 2:
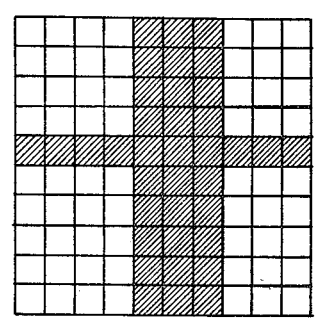
Figure 2:
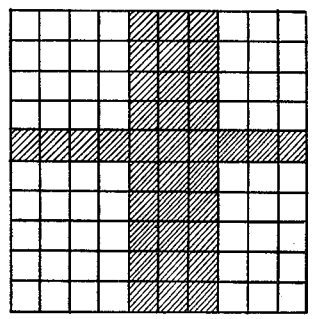
Figure 2:
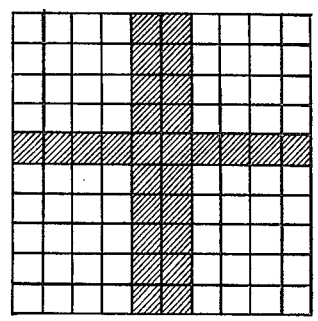
Figure 3:
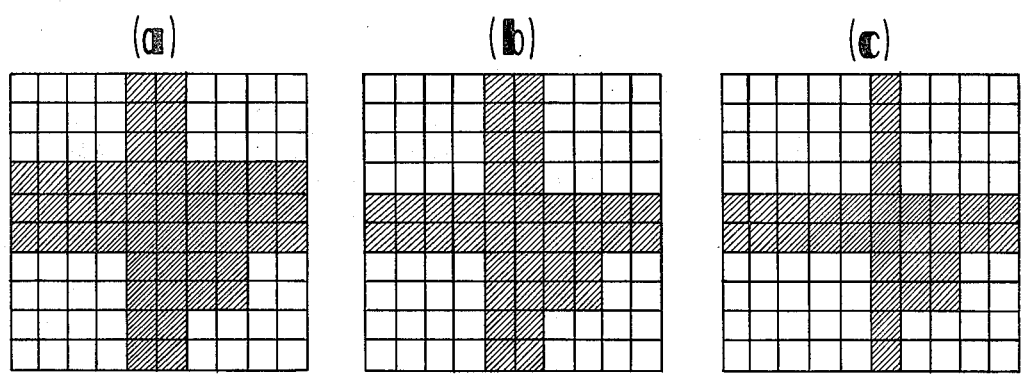
Figure 4:
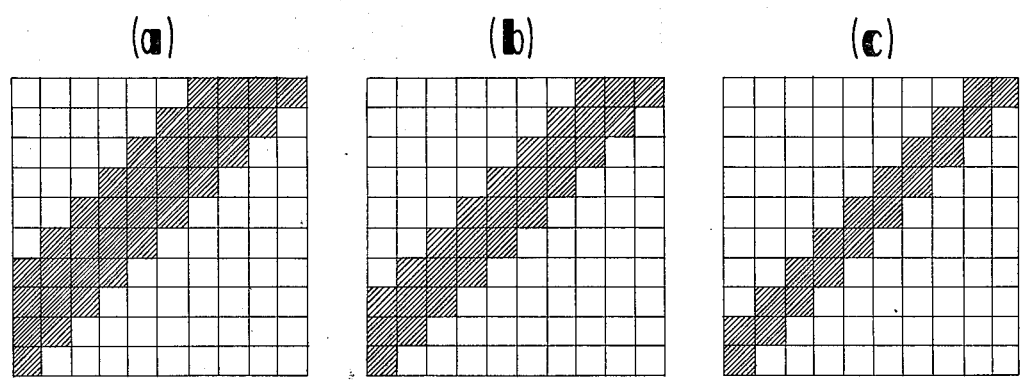
Figure 4:
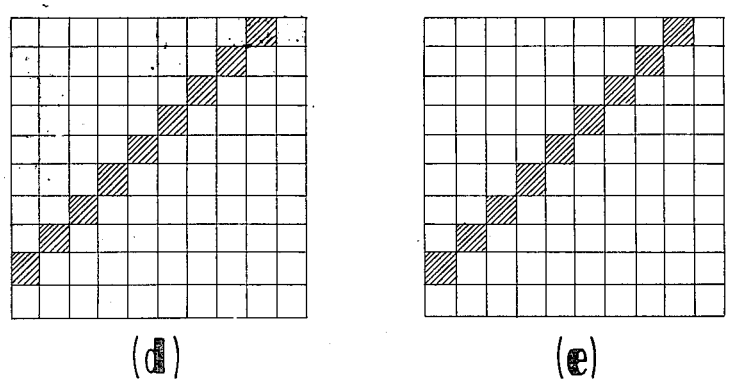

FIGS. 2 through 4 show the thinning processes carried out by a thinning circuit, such as 33 depicted in FIG. 1, used in a pattern transmission system according to a first embodiment of this invention, wherein the white or the black picture elements are said to be linked or connected with each other when the picture elements have either a side or even a vertex in common. The thinning processes are iteratively carried out in four modes. In the first mode, a black picture element having a white picture element in its upper neighborhood or adjacency is transformed into a white picture element with a proviso such that all the linkage or connection between the black picture elements is not lost by the transformation. Thus, an original pattern exemplified in (a) of each figure is transformed into a first thinned pattern shown in (b). In the second mode, a black picture element having a white picture element in its left neighborhood is transformed with the same proviso into a white picture element. The first thinned pattern is thus transformed into a second thinned pattern depicted in (c). In the third and the fourth modes, a black picture element having a white picture element in its lower and right neighborhoods, respectively, is transformed again with the same proviso into a white picture element. As a result, the second thinned pattern is successively transformed into a third and a fourth thinned pattern illustrated in (d) and (e), respectively. The eventually thinned pattern is herein given by the fourth thinned pattern. A black picture element having a white picture element in one of its upper, left, lower, and right neighborhoods will hereafter be called a boundary black picture element.

Figure 5:
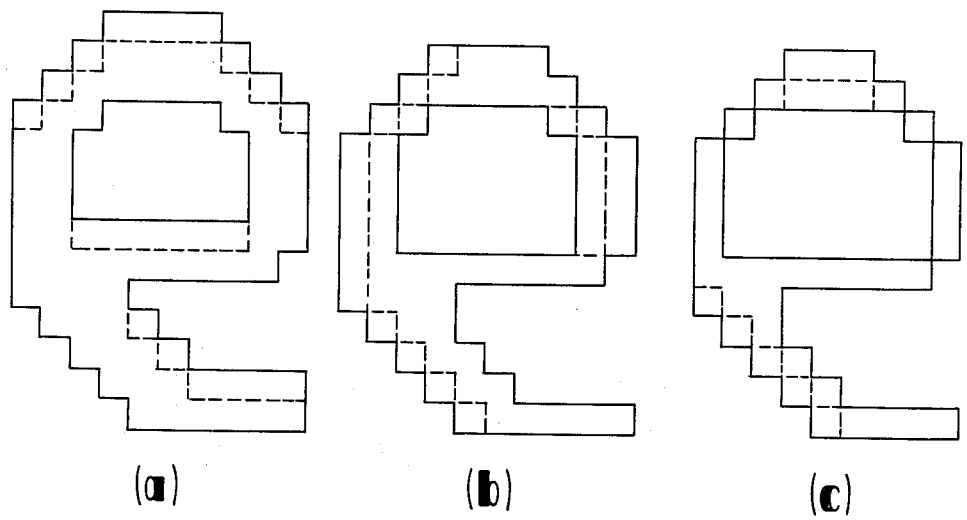
Figure 5:
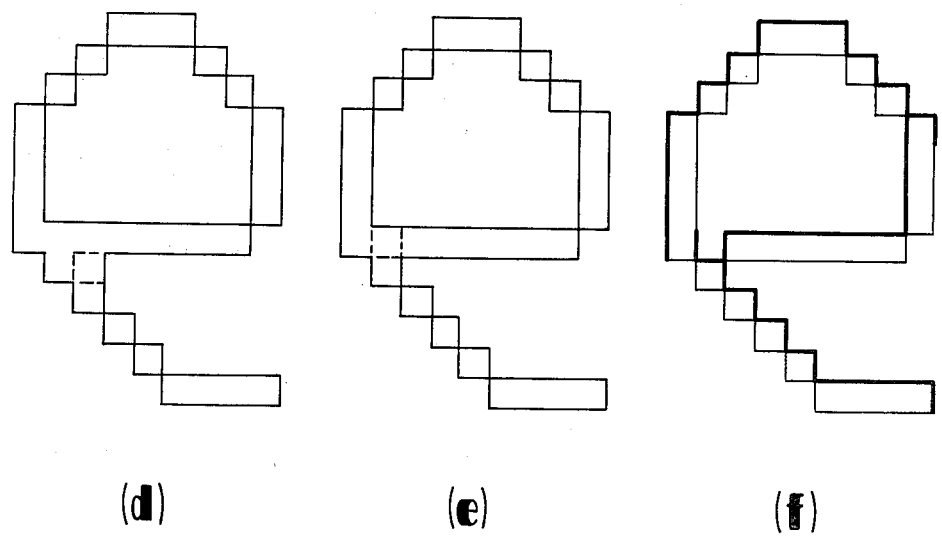

FIG. 5 shows another sequence of thinning processes for a letter "e" exemplified in (a). The thinning processes are carried through in five iterative stages. More particularly, the original pattern is thinned successively in the first through the fourth modes and again in the first mode as shown in (b), (c), (d), (e), and (f) into an eventually thinned pattern of a single picture element pattern width. In (a) through (e), black picture elements of a single picture element pattern width partitioned by broken lines are boundary black picture elements to be deleted, namely, to be transformed into white elements.

Figures 6, 7:
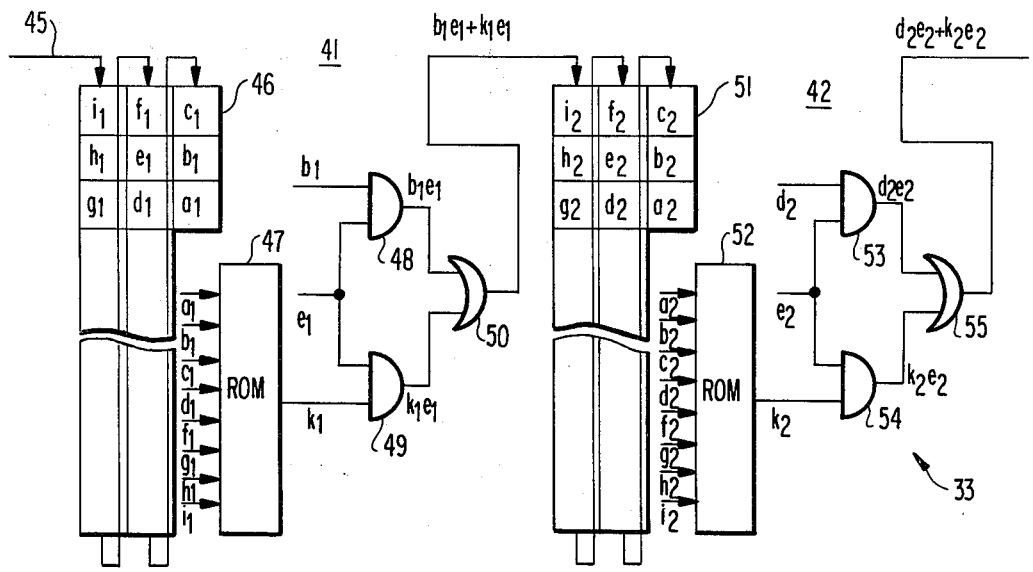
FIG. 6 is a block diagram of a thinning circuit mentioned in conjunction with FIGS. 2 through 5.
FIG. 7 shows matrices of picture elements for use in describing the thinning circuit depicted in FIG. 6.

Referring now to FIG. 6, the thinning circuit 33 comprises a series connection of a preselected number of similar thinning units, such as a first thinning unit 41 for the first mode of the thinning process and a second thinning unit 42 for the second mode. It will readily be understood that the preselected number should be equal to four and five for the processes illustrated with reference to FIGS. 2 through 4 and FIG. 5, respectively. A boundary black picture element is called an end or eventual picture element when at least one of the linkages or connections between the black picture elements would be lost should the boundary black element in question be transformed into a white picture element. The first thinning unit 41 is supplied with the logic pulse sequence from the photoelectric converter 32 (FIG. 1) through a connection 45 and comprises a shift register 46 having $(2n+3)$ stages for successive logic "0" and "1" pulses, where n represents the number of picture elements in each scanning line that is at least as long as the document width. A sequence of shift pulses for the shift register 46 is supplied from the control circuit 35 in synchronism with the above-mentioned timing pulses. Nine of the shift register stages are depicted in a two-dimensional array merely for convenience of understanding. The nine stages are for the pulses representative of a square matrix of $(3 \times 3)$ picture elements, namely, three elements a, b, and c in a first scanning line (called a previous line), those d, e, and f contiguous to the elements a, b, and c, respectively, in a second scanning line (named a present line) next following the previous line, and those g, h, and i contiguous to the elements d, e, and f, respectively, in a third scanning line (called a next line) immediately followed the present line. The pulses stored in the nine stages are designated by the picture element symbols with a suffix "1" added thereto, thus, $a_1$, $b_1$, and so forth. It is now possible by the use of such a $(2n+3)$-stage shift register to decide whether or not a middle picture element e of the present line (called a present element) is an end element. For this purpose, the first thinning unit 41 comprises a skelton read-only memory 47 responsive to the logic pulses $a_1$ through $d_1$ and $f_1$ through $i_1$ for eight picture elements a through d through i neighboring a present element e for producing a skelton signal $k_1$ that is given the logic "1" and "0" levels as will be described later when the present element e is and is not an end element, respectively.

Referring temporarily to FIG. 7, a present element e is an end element when the eight neighboring picture elements a through d and f through i are black and white as specified in each of matrices (a1) through (a4), (b1) through (b3), and (c1) through (c4) for the nine picture elements a through i described in conjunction with the shift register 46 (FIG. 6). In each matrix, symbols "1" and "0" represent black and white picture elements and a cross (X), a picture element that may be whichever of the black and the white elements. As the case may be, the positional relations of the black and the white picture elements shown in (a1) through (a4), (b1), (b2) and (b3), and (c1) through (c4) will be referred to as a first, a second, a third, and a fourth case, respectively.

Figure 8:
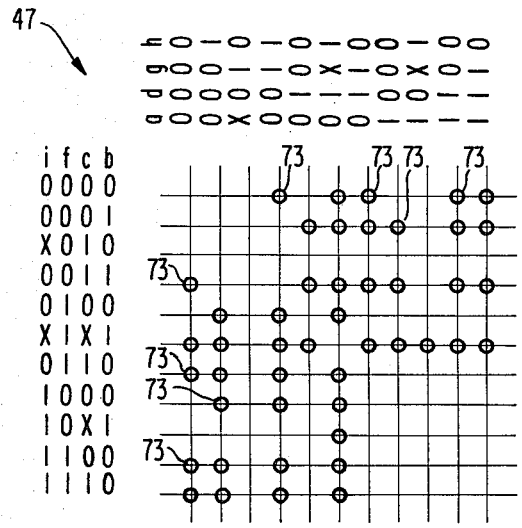
FIG. 8 shows a read-only memory used in the thinning circuit illustrated in FIG. 6.

Turning to FIG. 8, the skelton signal $k_j$ $(j=1, \ldots)$ is produced by the skelton read-only memory, such as 47, according to those conditions of the eight neighboring picture elements a through d and f through i of each present element e which are exemplified by the matrices in FIG. 7 and discussed by R. Stefanelli and A. Rosenfeld under the title of "Some Practical Thinning Algorithms for Digital Pictures" in Journal of the Association for Computing Machinery, Vol. 18, No. 2 (April, 1971), pages 255–264. More particularly, the read-only memory, such as 47, comprises crossing conductors having four higher-order addresses and four lower-order addresses, respectively. Logic pulses for the elements b, c, f, and i are supplied to the higher-order address conductors in accordance with the illustrated permutations of the logic "0" and "1" levels. Similarly, logic pulses for the elements a, d, g, and h are supplied to the lower-order address conductors. The pulses denoted by crosses (X) may be whichever of the logic levels. The skelton signal $k_j$ is given the logic "0" and "1" levels when the cross points are marked with and without circles (O), respectively.

Turning back to FIG. 6, the first thinning unit 41 further comprises a first AND gate 48 responsive to logic pulses $e_1$ and $b_1$ representative of the present element e and the picture element b in its upper neighborhood for giving an output signal $b_1 e_1$ thereof the logic "1" and "0" levels when the both elements b and e are black picture elements and otherwise, respectively. A logic pulse representative of the present element e and the skelton signal $k_1$ are supplied to a second AND gate 49, whose output signal $k_1 e_1$ is given the logic "1" and "0" levels according as the present element e is an end element and is not, respectively. Therefore, an OR gate 50 responsive to the signals produced by the AND gates 48 and 49 successively produces output signals $b_1 e_1 + k_1 e_1$ representative of a first thinned pattern. The second thinning unit 42 comprises another shift register 51 similar to that 46 in the first thinning unit 41. The logic pulses stored for the $(3 \times 3)$ picture elements a through i are now designated by $a_2$ through $i_2$. As is the case with the first thinning unit 41, the second thinning unit 42 comprises a skelton read-only memory 52, AND gates 53 and 54, and an OR gate 55, except that the AND gate 53 is supplied with logic pulses for the present element e and the picture element d in the left neighborhood of the element e. The OR gate 55 successively produces output signals $d_2 e_2 + k_2 e_2$ representative of a second thinned pattern. Likewise, thinning units (not shown) for the third and the fourth mode of the thinning processes successively produce OR gate output signals $h_3 e_3 + k_3 e_3$ and $f_4 e_4 + k_4 e_4$, respectively. By the use of four thinning units, it is possible as exemplified with reference to FIGS. 2 through 4 to produce the pre-processed signal representative of an eventually thinned pattern, together with the background thereof, in which the thinned pattern width is mostly reduced to a single picture element width.

Figure 9:
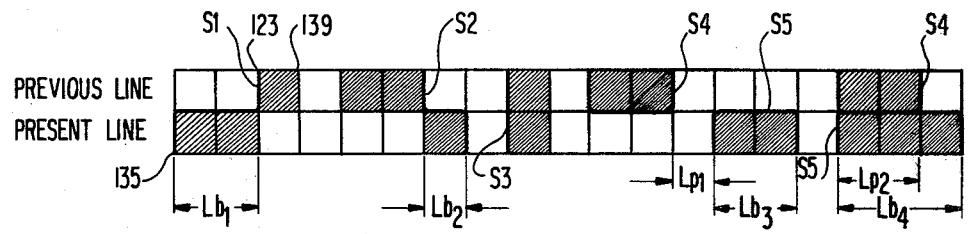
FIG. 9 shows partial patterns of a thinned pattern for describing encoding processes carried out by an encoding circuit of a pattern transmission system according to the first embodiment.

Turning now to FIG. 9, fundamental spatial or positional relationships between a first partial pattern, namely, a black run in a present line, and a second partial pattern, namely, a black run in a previous line, adjacent to the first partial pattern are classified into five following states with reference to various modes in which the black runs are linked or connected with each other. The classification is for providing a novel encoding algorithm or scheme according to which the pre-processed pulse or signal sequence is encoded by the encoding circuit 34 (FIG. 1). The coding herein presented is named SD (stroke direction) coding.

First State S1: A black run in the present line is connected with a leading or left side of a black run in the previous line;

Second State S2: A black run in the present line is connected with a trailing or right side of a black run in the previous line;

Third State S3: Black runs in the present and the previous lines have aligned leading and trailing sides;

Fourth State S4: A black run in the previous line disappears in the present line; and Fifth State S5: A black run newly appears in the present line (with no connection with a black run in the previous line).

That state is deemed to be the third state S3, in which no black runs appears both in the previous and the present lines. Other modes of connection are classified according to a first mode of encoding by combinations of the fourth and the fifth states S4 and S5 as exemplified at the right-hand end of FIG. 9. It is possible to group the fourth and the fifth states S4 and S5 into a new fourth state in which the black runs in the present and the previous lines have spatial relationships defined in none of the first through the third states S1 through S3.

Referring more specifically to FIG. 9, it is important to remind in connection with a pattern transmission system according to the first embodiment of this invention that the picture elements or the partial patterns are said to be linked or connected with each other when the elements or patterns have even a vertex in common. The first through the fifth states S1 through S5 are now encoded by state codes as shown in Table 1 hereunder. For the first, the second, and the fifth states S1, S2, and S5, use is also made of run length codes as indicated also in Table 1, where Lb(1) represents a black run length code for 1 picture elements and Lp(1), a leading side position code or white run length code for 1 picture elements as counted from the trailing side of a black run in the previous line to the leading side of a black run adjacent to the previous line black run in the present line. Therefore, $Lb_1$, $Lb_2$, $Lb_3$, $Lb_4$, $Lp_1$, and $Lp_2$ depicted in the figure are Lb(2), Lb(3), Lb(1), Lb(2), Lp(+1), and Lp(-2), respectively. The black run lengths are encoded as shown in Table 2 while the white run lengths, as shown in Table 3, where m represents the absolute value of the white run length and F(m) is given by, for example, the Wyle code described by H. Wyle, T. Erb, Table 1.

| State | State Code | Run Length Code |
|---|---|---|
| S1 | 100 | Lb(1) |
| S2 | 101 | Lb(1) |
| S3 | 0 | |
| S4 | 111 | |
| S5 | 110 | Lp(1) Lb(1) |

Table 2

| l | Lb |
|---|---|
| 1 | 1 |
| 2 | 01 |
| 3 | 001 |
| ... | ... |

Table 3

| l | Lp |
|---|---|
| 0 | 0 |
| —m | 10F(m) |
| —m | 11F(m) | and R. Banow under the title of "Reduced-Time Facsimile Transmission by Digital Coding" in IRE Transactions on Communications Systems, Vol. SC-9, No. 3 (September, 1961), pages 215–222. It is to be noted here that the above-described encoding is carried out in effect along only one of the boundary lines, indicated by a thick line, of the black run or runs in at least one of the present and the previous lines. In other words, it is unnecessary to encode the right sides of the black runs in the first and the third states S1 and S3 and the left sides in the second state S2.

Figure 10:
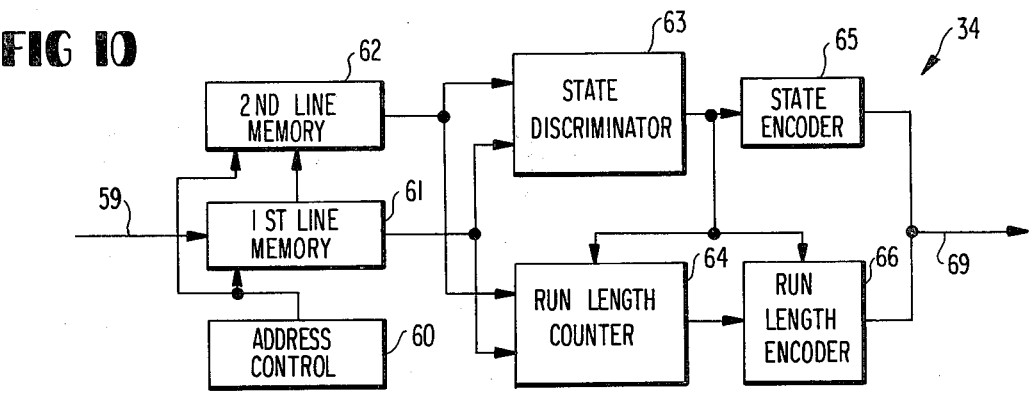
FIG. 10 is a block diagram of an encoding circuit mentioned in conjunction with FIG. 9.

Referring now to FIG. 10, the encoding circuit 34 is supplied with the pre-processed signal sequence from the thinning circuit 33 (FIG. 1) through a connection 59 and comprises an address control unit 60 controlled, in turn, by a control signal supplied from the control circuit 35 to produce a sequence of address control pulses in synchronism with the timing pulses mentioned hereinabove, a first line memory 61 responsive to the address control pulses for memorizing the logic pulses representative of a present line of the eventually thinned pattern, a second line memory 62 which is also controlled by the address control pulses and to which the logic pulses are transferred from the first line memory 61 as logic pulses of a previous line. Responsive to the address control pulses, the logic pulses are successively supplied from the line memories 61 and 62 to a state discriminator 63 for discriminating between the five states S1 through S5 to produce a state discrimination signal representative, at a time, of one of the five states. The state discrimination signal is supplied to a run length counter 64, a state encoder 65, and a run length encoder 66. It is readily possible to provide such a state discriminator. For example, the state discriminator 63 may comprise an Exclusive OR gate, a shift register, and a decoder (not shown). The Exclusive OR gate produces a change detection signal whenever a change in the logic levels occurs in whichever of the logic pulse sequences supplied thereto from the respective line memories 61 and 62. Responsive to the change detection signal, the contents of the line memories 61 and 62 are stored in the shift register. The decoder detects the shift register contents and produces the state discrimination signal. Responsive to a state discrimination signal representative of the first or the second state S1 or S2, the run length counter 64 counts the black run length Lb of the present line. The run length encoder 66 produces a run length code given in Table 2. Responsive to a state discrimination signal indicative of the fifth state S5, the run length counter 64 counts the white run length Lp and then the black run length Lb. The run length encoder 66 successively produces run length codes according to Tables 2 and 3. When the state discrimination signal specifies either of the third and the fourth states S3 and S4, the run length counter and encoder 64 and 66 are inoperative. Responsive to the state discrimination signals specifying the five states S1 through S5, the state encoder 65 produces the state codes with reference to Table 1. The state code and the run length code or codes, if any, are successively supplied to an output connection 69 as exemplified in the lower part of FIG. 9.

Figure 11:
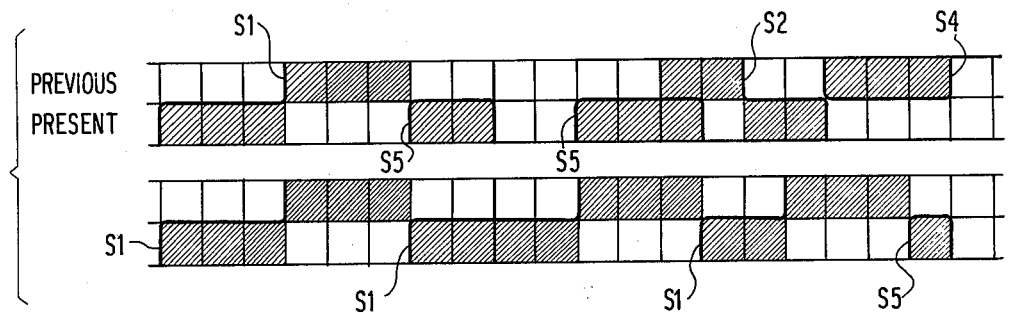
FIGS. 11 through 13 show other examples of partial patterns for describing the encoding circuit mentioned in connection with FIGS. 9 and 10.

Referring to FIG. 11, other examples of spatial relationships between black runs in the present and the previous lines are specified as noted by the symbols S1, S2, S4, and S5 of the states by the state discriminator 63 described in conjunction with FIG. 10. It is seen that the black runs of the present line connected to a single black run in the previous line are discriminated as regards the spatial relationships from left to right, in the order of scan.

Figure 12:
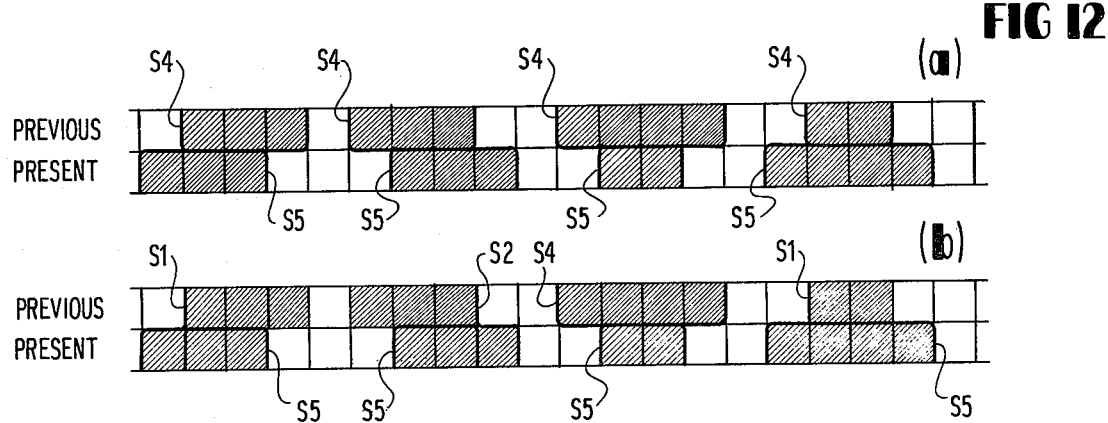
Figure 13:
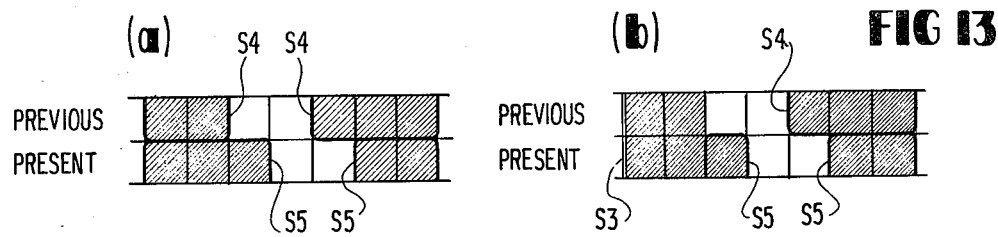

Referring to FIGS. 12 and 13, various spatial relationships between black runs in the present and the previous lines are shown in (a) of each figure by combinations of the fourth and the fifth states S4 and S5 according to the above-described first mode for encoding. It is possible according to a second mode of encoding to divide a black run appearing in the present line in a staggered spatial relationship to a black run in the previous line into two subpartial patterns at a pertinent one of the leading and the trailing sides of the previous line black run and to specify from left to right the spatial relationships or the modes of connection by combinations of relevant ones of the five states S1 through S5 as exemplified in (b).

Turning now to FIG. 14, an original pattern "t" is shown in (a) as divided into (12×18) picture elements mentioned above. According to the above-described thinning processes, the original pattern is successively transformed into a first through a fourth or eventually thinned pattern as shown in (b) through (e). It will be seen that the short vertical stroke protruding in (a) above the horizontal stroke disappears in (e).

Referring to FIG. 15, a thinning circuit 33 (FIGS. 1 and 6) of a pattern transmission system according to a second embodiment of this invention carries out the thinning processes with the end or eventual element defined by the use of matrices (d1) through (d8) of the (3×3) picture elements in addition to the matrices illustrated with reference to FIG. 7. It will be noted in FIG. 15 that a boundary black picture element situated at a vertex of a black triangle is defined to be an end element. In general, the vertical angle of the triangle at the vertex in question may be acute, right angles, or obtuse. It has been confirmed that the boundary black element should be deemed as an end element only when the vertical angle under consideration is an acute angle.

Referring to FIG. 16, an original pattern "t" shown in (a) is subjected to the thinning processes by the use of a thinning circuit 33 of a pattern transmission system according to the second embodiment. Inasmuch as picture elements 71 and 72 at the top ends in (a) are the boundary black picture elements shown as the present or middle element in the matrix (d6), these elements 71 and 72 are retained as black elements in a first thinned pattern depicted in (b) and also in an eventually thinned pattern depicted in (c).

Referring to FIG. 17, a read-only memory used as each of the skelton read-only memories, such as 47 and 52, of a thinning circuit 33 of a pattern transmission system according to the second embodiment produces the skelton signal $k_j$ (j=1, 2, ... ) as described with reference to FIG. 8. It will be seen that the cross points denoted by 73 in FIG. 8 now produces logic "1" skelton signals.

Turning now to FIG. 18, a black picture element is defined, for a thinning circuit 33 (FIGS. 1 and 6) and an encoding circuit 34 (FIGS. 1 and 10) of a pattern transmission system according to a third embodiment of this invention, to be linked or connected with at least one other black element only when the black elements in question have a side in common. The original patterns exemplified in FIGS. 2 and 3 at (a) are also transformed into the eventually thinned patterns depicted at (e). The original pattern shown at (a) of FIG. 18 is again transformed into a second thinned pattern depicted in (c) as is the case with (a) through (c) of FIG. 4. The third through the eventually thinned patterns depicted at (d) and (e) of FIG. 18, however, are different from the correspondingly thinned patterns shown in FIG. 4.

Figure 19:
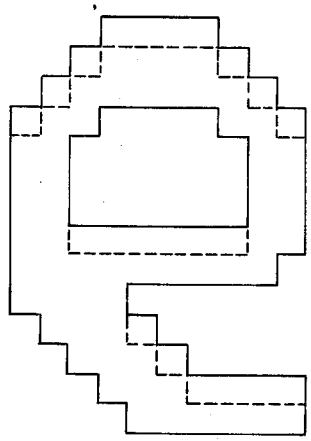
Figure 19:
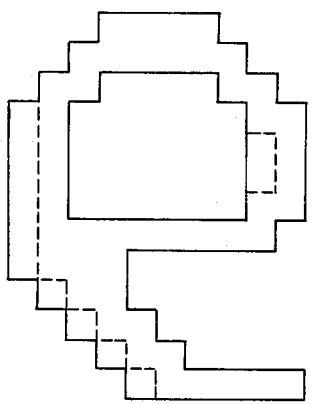
Figure 19:
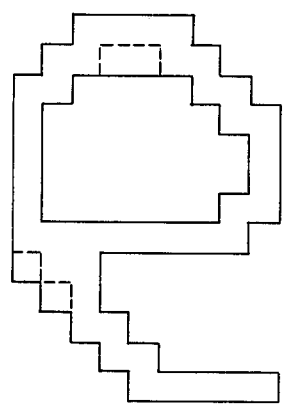
Figure 19:
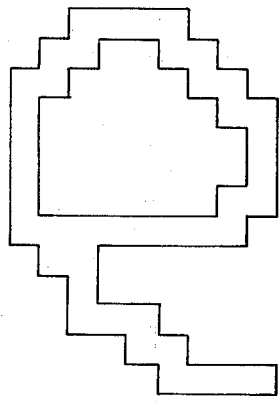
Figure 19:
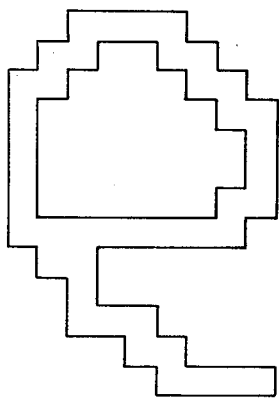
Figure 19:
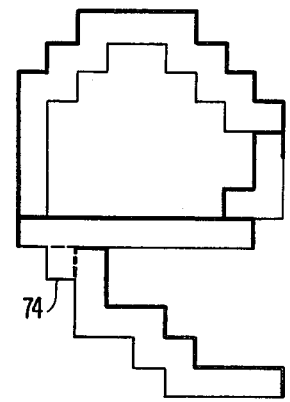

Referring to FIG. 19, an original pattern "e" exemplified at (a) is transformed into a fifth thinned pattern depicted at (f). If the thinning processes are carried out a step further to delete the black element 74 having a white element in its right neighborhood, it is seen from (f) that each black element is contiguous to another black element with a side in common even in an eventually thinned pattern of a single picture element pattern width.

Referring to FIG. 20, a letter "e" shown in (a) is an original pattern. With a thinning circuit 33 of a pattern transmission system according to the first or the second embodiment, the original pattern is eventually thinned into a pattern depicted in (b). With a thinning circuit 33 of a pattern transmission system according to the third embodiment, the eventually thinned pattern is shown in (b).

Referring to FIG. 21, a read-only memory used as each of the skelton read-only memories, such as 47 and 52, of a thinning circuit 33 for use in a pattern transmission system according to the third embodiment produces the skelton signal $k_j$ (j=1, 2, ... ) as described with reference to FIG. 8.

Referring to FIGS. 22 and 23, various spatial relationships or modes of connection between black runs in the present and the previous lines are encoded with a pattern transmission system according to the first or the second embodiment as depicted in (a). With an encoder 34 of a pattern transmission system according to the third embodiment, the spatial relationships are encoded as shown in (b).

Turning to FIGS. 24 and 25, a thinned pattern is encoded in a conventional pettern transmission system as regards distances, such as $Ld_1$ and $Ld_2$, between the leading and the trailing sides of each black run. In other words, all boundary lines of the black runs are encoded as indicated by thick lines. In contrast, substantially only one boundary line of each black run is encoded according to this invention. Such boundary lines are indicated also by thick lines in FIG. 25 as well as in FIG. 5 (f) and FIG. 19 (f). It is readily understood that the amount of the information to be transmitted is reduced according to this invention nearly to a half of that needed in a conventional system.

Figure 26:
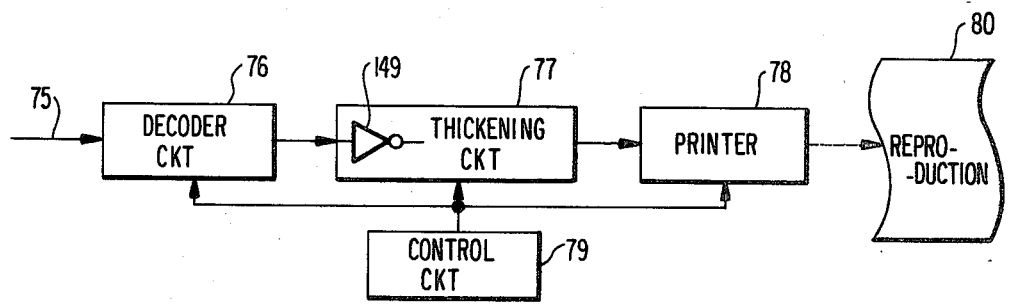
FIG. 26 is a block diagram of an decoding device of a pattern transmission system according to this invention.

Referring now to FIG. 26, a pattern decoding device of a pattern transmission system according to the present invention will be described as applied to a facsimile receiver for receiving a band-compressed signal through a link 75 from a pattern encoding device illustrated with reference to FIGS. 1 through 13. The decoding device comprises a decoder circuit 76 for decoding the band-compressed signal into a sequence of logic "0" (white) and logic "1" (black) pulses representative of an eventually thinned pattern, a thickening circuit 77 responsive to the logic pulse sequence for producing a post-processed signal representative of a thickened pattern, a printer or recorder 78, and a control circuit 79 for supplying control and synchronizing signals to the decoder circuit 76, the thickening circuit 77, and the printer or recorder 78. The printer or recorder 78, as called herein, is for reproducing the thickened pattern on a receiving medium 80 in response to the post-processed signal.

Figure 27:
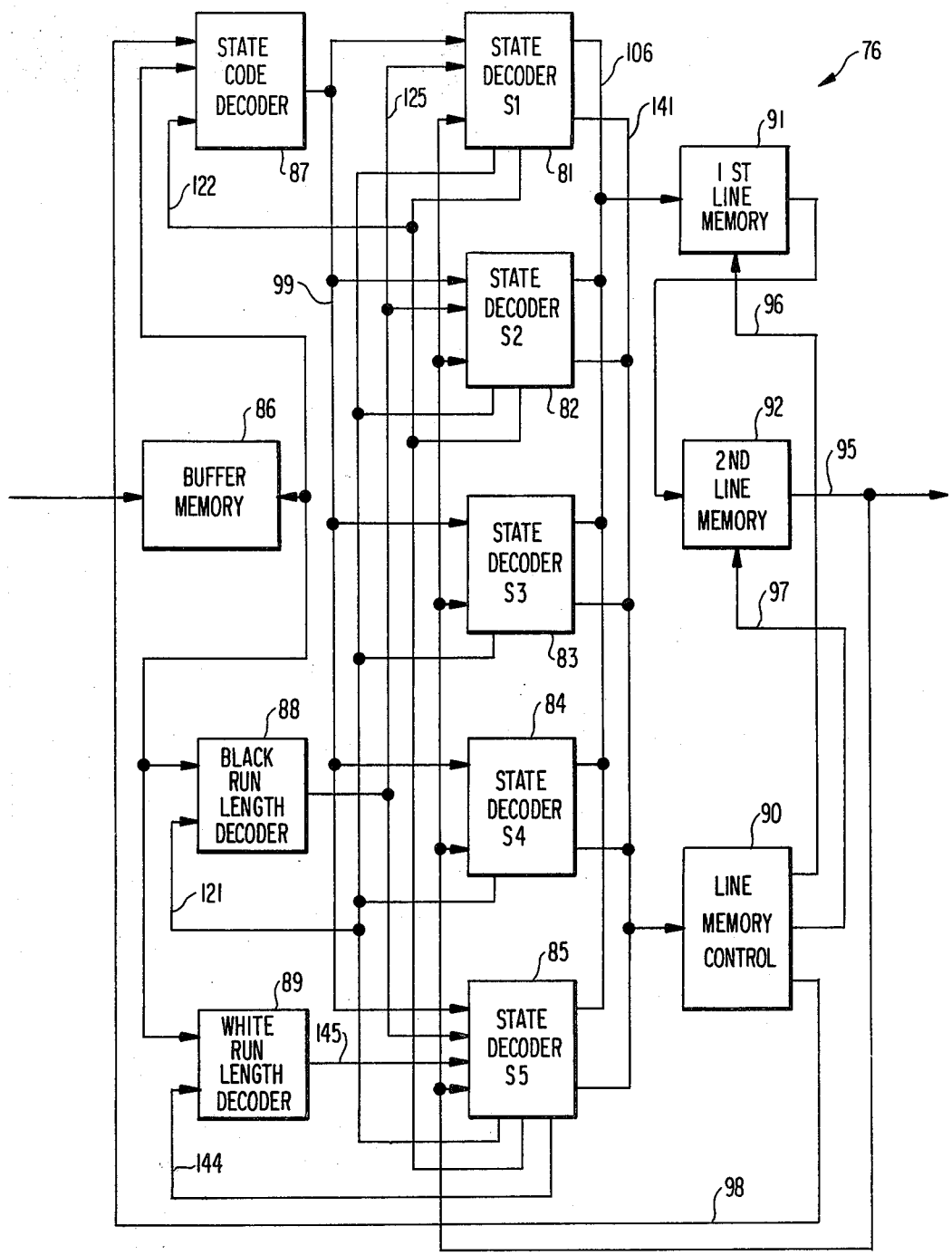
FIG. 27 is a block diagram of a decoder circuit of the decoding device illustrated in FIG. 26.

Turning to FIG. 27, the decoder circuit 76 comprises first through fifth state decoders 81, 82, 83, 84, and 85, a buffer memory 86 for the band-compressed signal, a state code decoder 87, a black run length code decoder 88, a white run length code decoder 89, a line memory control unit 90, and first and second line memories 91 and 92, each having addresses numbered from zero to (n−1). As will soon become clear, the second line memory 62 produces 9 logic pulse sequence 95 that is supplied to the thickening circuit 77 and to each of the state decoders 81 through 85. Such logic pulses for a present line are produced by one of the state decoders 81 through 85 at a time and stored in the first line memory 61 under the control of a sequence of first address pulses 96 that are produced by the control unit 90 and count generally up and occasionally down the first line memory addresses. Under the control of a sequence of second address pulses 97 produced by the control unit 90, the addresses of the second line memory 92 are unidirectionally counted up to produce the logic pulse sequence for a scanning line, when the control unit 90 makes the address pulse sequences 96 and 97 transfer the logic pulses from the first line memory 91 to the second line memory 92 as logic pulses for a previous line, resets the address pulse sequences 96 and 97 to zero, and supplies the state code decoder 87 with a transfer completion signal 98. The state code decoder 87 now reads the buffer memory 86 bit by bit until the decoder 87 detects a state code for one of the first through the fifth state S1 through S5 to supply a connection 99 with one of first through fifth start signals 99a, 99b, 99c, 99d and 99e (not shown) that corresponds to the detected state code. The start signals 99a through 99e may be coded signals for the state decoders 81 through 85. Alternatively, the connection 99 may be multiple connections for the state decoders 81 through 85.

Referring to FIG. 28, the first state decoder 81 comprises a common address control pulse generator 100 and first through third flip-flops 101, 102, and 103. When set and reset, the first flip-flop 101 supplies the first line memory 91 with logic "1" (black) and logic "0" (white) pulses, respectively, through a connection 106. When set and reset, the second flip-flop 102 supplies the line memory control unit 90 through a connection 107 with an output signal that specifies the first line memory addresses to be counted up and down, respectively. When set and reset, the third flip-flop 103 supplies the control unit 90 through a connection 108 with an output signal that specifies the first line memory 91 to be read out and written in, respectively.

In FIG. 28, the first start signal 99a puts the common address control pulse generator 100 into operation through an OR gate 109 to make the same generate a sequence of common address control pulses, which are supplied to the line memory control unit 90 through an OR gate 110 and a connection 111 as address control pulses for the first line memory 91 and through a connection 112 as address control pulses for the second line memory 92. The start signal 99a also resets the first flip-flop 101 through an OR gate 116, sets the second flip-flop 102 through an OR gate 117, and resets the third flip-flop 103 through an OR gate 118. White pulses are therefore successively written in the first line memory 91. Logic pulses 95 read out of the second line memory 92 in the meantime are successively supplied to a change detector 120, which produces white-to-black and black-to-white change signals 121 and 122 upon detection of changes from white to black and from black to white, respectively. A white-to-black change signal 121 produced at, for example, an address 123 (FIG. 9) puts the pulse generator 100 out of operation through an OR gate 124 to suspend counting up of the first and the second line memory addresses, makes the black run length code decoder 88 (FIG. 27) produce a black run length signal 125 giving the black run length by a binary number and a black run length code completion signal 126, resets the second flip-flop 102 through an OR gate 127, and sets the third flip-flop 103 through an OR gate 128.

Further referring to FIG. 28, the first state decoder 81 comprises a specific address control pulse generator 130 and first and second counters 131 and 132. Responsive to the black run length code completion signal 126, the pulse generator 130 is put into operation of generating a sequence of specific address control pulses supplied, among others, to the connection 111 through the OR gate 110 as the first line memory address control pulses. At the same time, the black run length code completion signal 126 sets the black run length signal 125 in the counters 131 and 132. The second flip-flop 102 reset by the white-to-black change signal 121 makes the control unit 90 produce the first address pulses 96 for counting down the first line memory addresses in cooperation with the specific address control pulses and enables a first AND gate 133 through an inverter 134. When counted down to zero by the specific address control pulses supplied through the enabled AND gate 133, the first counter 131 produces a first counter signal 136 for setting the first and the second flip-flops 101 and 102 and resetting the third flip-flop 103. At this instant, an address 135 (FIG. 9) is reached.

In FIG. 28, the second flip-flop 102 set by the first counter signal 136 now makes the control unit 90 produce the first address pulses 96 for counting up the first line memory addresses in cooperation with the first line memory address control pulses generated by the pulse generator 130 and enables a second AND gate 137. Black pulses are therefore successively written in the first line memory 91. When counted down to zero by the specific address control pulses supplied through the seccond AND gate 137, the second counter 132 produces a second counter signal 138 for putting the specific address control pulse generator 130 out of operation, for resetting the first flip-flop 101, and for putting the common address control pulse generator 100 into operation to make the control unit 90 continue production of the first address pulses 96 in the count up mode and resume production of the second address pulses 97. Inasmuch as the first flip-flop 101 is set by the second counter signal 138, white pulses are written successively in the first line memory 91.

Still further referring to FIG. 28, the change detector 120 produces a black-to-white change signal 122 when an address 139 (FIG. 9) is reached. The change signal 122 puts the common address control pulse generator 100 out of operation and the state code decoder 87 (FIG. 27) into operation for a next following state code, keeps the first flip-flop 101 in the reset state, resets the second flip-flop 102, and sets the third flip-flop 103. The first state decoder 81 is put into a reset state and kept therein until a first start signal 99a is newly produced by the state code decoder 87.

Summarizing with reference to FIG. 27, the first state decoder 81 is put into operation by the first start signal 99a to make, by way of a control connection 141 (the connections 107, 108, 111, and 112), the line memory control unit 90 produce the first and the second address pulses 96 and 97. The state decoder 81 supplies white pulses to the first line memory 91 through the connection 106, which pulses are successively written in the first line memory addresses. When supplied with logic pulses 95 representative of a black run, the state decoder 81 produces a white-to-black change signal 121 to make the black run length code decoder 88 start reading the buffer memory 86 bit by bit until a black run length code Lb is detected, decoded, and supplied back to the state decoder 81 as a black run length signal 125. Responsive to the decoded black run length, the state decoder 81 makes the control unit 90 count down the first line memory addresses and then count up the same. In the meanwhile, the state decoder 81 supplies black pulses to the first line memory 91 through the connection 106, which pulses are written in the first line memory addresses of a number equal to the decoded black run length. The state decoder 81 now makes the control unit 90 keep the count up mode of the first address pulses 96 and re-start production of the second address pulses 97. When supplied with logic pulses 95 representative of a white run, the state decoder 81 produces a black-to-white change signal 122 and is put into a rest state until the state code decoder 87 put into operation by the black-to-white change signal 122 detects a new state code representative of the first state S1 and again produces a first start signal 99a.

Further referring to FIG. 27, the second through the fifth state decoders 82 through 85 are similar in structure and operation to the first state decoder 81. The second state decoder 82, however, causes a black run in the present line to be written in the first line memory 91 in direct response to a black-to-white change signal 122 and is put into a rest state when the first and the second line memory addresses are counted up by a common number equal to the black run length. The third state decoder 83 need no black run length signal 125 because the black run in the present line has a trailing side aligned with the trailing side of the black run in the previous line. This applies to the fourth state decoder 84, which is put into a rest state when a black-to-white change signal 122 is produced. The fifth state decoder 85, when put into operation by a fifth start signal 99e, sends a start signal 144 to the white run length code decoder 89, which starts reading the buffer memory 86 bit by bit until a white run length code Lp is detected and decoded into a white run length signal 145. Responsive to the white run length indicated by the white run length signal 145, the first state decoder 85 makes the control unit 90 count up the first and the second line memory addresses and produce a start signal, similar to the white-to-black change signal 121, to put the black run length code decoder 88 into operation. The subsequent operation of the fifth state decoder 85 is similar to that of the second state decoder 82.

Turning back to FIG. 26, the thickening circuit 77 is similar in structure to the thinning circuit 33 except that an inverter 149 is put between a connection and a shift register that correspond to the connection 45 and the shift register 46 depicted in FIG. 6, respectively. In the example being illustrated, each of skelton read-only memories corresponding to the memories, such as 47 and 52, of the thinning circuit 33 comprises a conductor arrangement illustrated with reference to FIG. 8. When the decoding device is for use in combination with an encoding device for pattern transmission systems according to the second and the third embodiments, the read-only memory of the thickening circuit 77 should have the conductor arrangements described in conjunction with FIGS. 17 and 21, respectively.

What is claimed is:

1. A system for transmitting an original pattern printed with an original pattern stroke width on a surface of a pattern carrying medium and with a first area left on said surface as a background of said original pattern, said original pattern and said first area being substantially of a first and a second tone, respectively, said system comprising:

sampling means supplied with said pattern carrying medium for sampling picture elements from said original pattern and said first area substantially along rectilinear and parallel scanning lines covering said surface in succession, each of said picture elements having four substantally equal sides and four vertices, the picture elements in the successive scanning lines being arranged substantially along straight lines that tharsversely cross said scanning lines, each of said scanning lines having a leading and a trailing end, said original pattern stroke width being generally of at least two picture elements, said sampling means thereby producing electrical signals successively representative of said picture elements and having a first and a second level when the picture elements are of said first and said second tones, respectively;

thinning means responsive to said electrical signals for thinning said original pattern into an eventually thinned pattern, with said first area accordingly widened into a second area serving in effect as a background of said thinned pattern, in accordance with a predetermined law as regards positional relations between each of the first-tone picture elements and the neighboring picture elements, said thinned pattern having a thinned pattern stroke width of a substantially single picture element and being composed of partial patterns, each consisting of at least one picture element of said first tone and having a leading and trailing side in one of said scanning lines, said leading and said trailing sides being nearer to the leading and the trailing ends of said one scanning line, respectively, said thinning means thereby producing a pre-processed signal representative of said thinned pattern and said second area;

classifying means responsive to said pre-processed signal for successively classifying spatial relationships between a first of said partial patterns in a first of said scanning lines and a second partial pattern adjacent to said first partial pattern in a second scanning line next preceding in the succession said first scanning line into a first state in which said first partial pattern is connected with the leading side of said second partial pattern, a second state in which said first partial pattern is connected with the trailing side of said second partial pattern, a third state in which said first and said second partial patterns have aligned leading and trailing sides, and a fourth state in which said first and said second partial patterns have other spatial relationships, said classifying means thereby producing a discrimination signal specifying the successively classified states; and encoding means responsive to said pre-processed and said discrimination signals for encoding said first partial pattern with reference to the classified state, said encoding means thereby producing a band-compressed signal representative of said original pattern.

2. A system as claimed in claim 1, wherein said classifying means classifies said spatial relationships into said first and said second states when said first partial pattern is connected with one of the leading and the trailing sides of said second partial pattern with a vertex of one of the picture elements of said first tone had in common by said first and said second partial patterns.

3. A system as claimed in claim 2, wherein said thinning means comprises:

first means responsive to said electrical signals for retaining at a time the electrical signals representative of said each first-tone picture element, a first through a third picture element in said second scanning line, a fourth and a fifth picture element contiguous in said first scanning line to the leading and the trailing sides of said each first-tone picture element, respectively, and a sixth through an eighth picture element in a third scanning line next succeeding in the succession said first scanning line, said first, said fourth, and said sixth picture elements, said second, said each first-tone, and said seventh picture elements, and said third, said fifth, and said eighth picture elements being collinear substantially along the respective straight lines, said first through said eighth picture elements thus forming a matrix of (3×3) picture elements together with said each first-tone picture element, said first, said third, said sixth, and said eighth picture elements serving as corner picture elements of said matrix;

second means responsive to the electrical signals retained by said first means for producing an inhibit signal only in each of a first case where only one of said second, said fourth, said fifth, and said seventh picture elements is of said first tone, a second case where at least said second, said fourth, said fifth, and said seventh picture elements are of said second tone, a third case where at least said second and said seventh picture elements and at least said fourth and said fifth picture elements are of one and the other, respectively, of said first and said second tones, a fourth case where at least one of said corner picture elements is of said first tone and where at least two picture elements contiguous in said matrix to said each first-tone picture element along one of said scanning lines and along one of said straight lines, respectively, are of said second tone; and third means responsive to the electrical signals retained by said first means and said inhibit signal for making the electrical signal representative of said each first-tone picture element represent in said pre-processed signal a picture element of said second tone only in the absence of said inhibit signal.

4. A system as claimed in claim 2, wherein said thinning means comprises:

first means responsive to said electrical signals for retaining at a time the electrical signals representative of said each first-tone picture element, a first through a third picture element in said second scanning line, a fourth and a fifth picture element contiguous in said first scanning line to the leading and the trailing sides of said each first-tone picture element, respectively, and a sixth through an eighth picture element in a third scanning line next succeeding in the succession said first scanning line, said first, said fourth, and said sixth picture elements, said second, said each first-tone, and said seventh picture elements, and said third, said fifth, and said eighth picture elements being collinear substantially along the respective straight lines, said first through said eighth picture elements thus forming a matrix of (3×3) picture elements together with said each first-tone picture element, said first, said third, said sixth, and said eighth picture elements serving as corner picture elements of said matrix;

second means responsive to the electrical signals retained by said first means for producing an inhibit signal only in each of a first case where only one of said second, said fourth, said fifth, and said seventh picture elements is of said first tone, a second case where at least said second, said fourth, said fifth, and said seventh picture elements are of said second tone, a third case where at least said second and said seventh picture elements and at least said fourth and said fifth picture elements are of one and the other, respectively, of said first and said second tones, a fourth case where at least one of said corner picture elements is of said first tone and where at least two picture elements contiguous in said matrix to said each first-tone picture elements along one of said scanning lines and along one of said straight lines, respectively, are of said second tone, and a fifth case where only one of said corner picture elements and only one picture element contiguous in said matrix to said one corner picture element along one of said scanning and said straight lines are of said first tone; and third means responsive to the electrical signals retained by said first means and said inhibit signal for making the electrical signal representative of said each first-tone picture element represent in said pre-processed signal a picture element of said second tone only in the absence of said inhibit signal.

5. A system as claimed in claim 1, wherein said classifying means classifies said spatial relationships into said first and said second states when said first partial pattern is connected with one of the leading and the trailing sides of said second partial pattern with a side of one of the picture elements of said first tone had in common by said first and said second partial patterns.

6. A system as claimed in claim 5, wherein said thinning means comprises:

first means responsive to said electrical signals for retaining at a time the electrical signals representative of said each first-tone picture element, a first through a third picture element in said second scanning line, a fourth and a fifth picture element contiguous in said first scanning line to the leading and the trailing sides of said each first-tone picture element, respectively, and a sixth through an eighth picture element in a third scanning line next succeeding in the succession said first scanning line, said first, said fourth, and said sixth picture elements, said second, said each first-tone, and said seventh picture elements, and said third, said fifth, and said eighth picture elements being collinear substantially along the respective straight lines;

second means responsive to the electrical signals retained by said first means for producing an inhibit signal only in each of cases where one of said second, said fourth, said fifth, and said seventh picture elements is of said first tone and where each of at least two of said first through said eighth picture elements other than said one of said second, said fourth, said fifth, and said seventh picture elements is of said first tone and loses at least one of said at least two picture elements that has a side in common with said each of said at least two picture elements should said each first-tone picture element be transformed into a picture element of said second tone; and third means responsive to the electrical signals retained by said first means and said inhibit signal for making the electrical signal representative of said each first-tone picture element represent in said pre-processed signal a picture element of said second tone only in the absence of said inhibit signal.

7. A system as claimed in claims 2 or 5, wherein said classifying means comprises:

control signal producing means for producing an address control signal cyclically specifying said straight lines;

first line memory means responsive to said address control signal for memorizing the pre-processed signal for said first scanning line to produce a first line memory signal taking a first and a second value for successively representing the picture elements of said first and said second tones, respectively, in said first scanning line;

second line memory means responsive to said address control signal for memorizing the pre-processed signal for said scanning line to produce a second line memory signal taking the first and the second values for successively representing the picture elements of said first and said second tones, respectively, in said second scanning line; and a state discriminator responsive to said first and said second line memory signals for discriminating between said first through said fourth states to produce a discrimination signal representative, at a time, of the discriminated one of said first through said fourth states by detecting a change in each of said first and second line memory signals between said first and said second values.

8. A system as claimed in claim 7, wherein said encoding means comprises:

a state encoder responsive to said discrimination signal for encoding said first through said fourth states into predetermined state codes, respectively;

counter means connected to said state discriminator and said first and said second line memory means for counting, in response to the discrimination signal representative of each of said first, said second, and said fourth states, the number of at least one picture element in said first partial pattern to produce a first number signal representative of the counted number and for counting, in response to the discrimination signal representative of said fourth state and with reference to said second line memory signal, that number of at least one picture element in said first scanning line which is counted to the leading side of said first partial pattern from the trailing side of the second partial pattern that has no leading and trailing sides connected with said first partial pattern but has the leading side not trailing the leading side of said first partial pattern, said counter means thereby producing a second number signal representative of the last-mentioned number; and run length encoding means responsive to said discrimination signal and said first and said second number signals for encoding said first and said second number signals into a first and a second run length code representative of the numbers represented by said first and said second number signals, respectively.

9. A pattern reproducing system for use in combination with the system of claim 1, comprising:

decoder means for decoding said band-compressed signal into a logic pulse sequence representative of said thinned pattern and said second area;

thickening means responsive to said logic pulse sequence for thickening said thinned pattern into an eventually thickened pattern in accordance with said predetermined law, said thickening means thereby producing a post-processed signal representative of said thickened pattern; and reproducing means responsive to said post-processed signal for reproducing a reproduced pattern corresponding to said original pattern.

10. A system for transmitting an original pattern printed with an original pattern stroke width on a surface of a pattern carrying medium and with a first area left on said surface as a background of said original pattern, said original pattern and said first area being substantially of a first and a second tone, respectively, said system comprising:

sampling means supplied with said pattern carrying medium for sampling picture elements from said original pattern and said first area substantially along rectilinear and parallel scanning lines covering said surface in succession, each of said picture elements having four side and four vertices, the picture elements in the successive scanning lines being arranged substantially along straight lines that transversely cross said scanning lines, each of said scanning lines having a leading and a trailing end, said original pattern stroke width being generally of at least two picture elements, said sampling means thereby producing electrical signals successively representative of said picture elements and having a first and a second level when the picture elements are of said first and said second tones, respectively;

thinning means responsive to said electrical signals for thinning said original pattern into an eventually thinned pattern, with said first area accordingly widened into a second area serving in effect as a background of said thinned pattern, in accordance with a predetermined law as regards positional relations between each of the first-tone picture elements and the neighboring picture elements, said thinned pattern having a thinned pattern stroke width of a substantially single picture element and being composed of partial patterns, each consisting of at least one picture element of said first tone and having a leading and a trailing side in one of said scanning lines, said leading and said trailing sides being nearer to the leading and the trailing ends of said one scanning line, respectively, said thinning means thereby producing a pre-procesed signal representative of said thinned pattern and said second area;

classifying means responsive to said pre-processed signal for successively classifying spatial relationships between a first of said partial patterns in a first of said scanning lines and a second partial pattern adjacent to said first partial pattern in a second scanning line next preceding in said succession said first scanning line into a first state in which said first partial pattern has the leading side leading the leading side of said second partial pattern and the trailing side aligned therewith, a second state in which said first partial pattern has the leading side trailing the leading side of said second partial pattern and aligned with the trailing side thereof, a third state in which said first and said second partial patterns have aligned leading and trailing sides, and a fourth state in which said first partial pattern has at least one of the leading and the trailing sides out of alignment with the corresponding sides of said second partial pattern, said classifying means thereby producing a discrimination signal specifying the successively classified states; and encoding means for encoding said pre-processed and said discrimination signals into a band-compressed signal representative in effect of said original pattern, said encoding means comprising:

state encoder means for encoding the discrimination signals specifying said first through said fourth states into first through fourth state code signals, respectively;

first run length encoder means responsive to said pre-processed signal and the discrimination signal specifying each of said first, said second, and said fourth states for encoding a first run length into a first run length code signal following the state code signal for the last-mentioned discrimination signal, said first run length being given by the number of at least one picture element of which said first partial pattern consists in said each state; and second run length encoder means responsive to said pre-processed signal and the discrimination signal specifying said fourth state for encoding a second run length into a second run length code signal following the state code signal for the last-mentioned discrimination signal and preceding the first run length code signal for the first run length of said first partial pattern in said fourth state, said second run length being given by that number of at least one picture element in said first scanning line which is counted to the leading side of the last-mentioned first partial pattern from the trailing side of said second partial pattern that has the spatial relationships classified into said fourth state with the last-mentioned first partial pattern;

said band-compressed signal comprising said state code, said first run length code, and said second run length code signal.

11. A pattern reproducing system for use in combination with the system of claim 10, comprising:

decoder means for decoding said band-compressed signal into a logic pulse sequence representative of said thinned pattern and said second area;

thickening means responsive to said logic pulse sequence for thickening said thinned pattern into an eventually thickened pattern in accordance with said predetermined law, said thickening means thereby producing a post-processed signal representative of said thickened pattern; and reproducing means responsive to said post-processed signal for reproducing a reproduced pattern corresponding to said original pattern;

said decoder means comprising:

first line memory means having consecutively numbered addresses corresponding to the picture elements in each scanning line and specified by each of count-up and count-down pulses supplied thereto for counting up and down said addresses, respectively, said first line memory means being for memorizing one of a first picture element signal representative of a picture element of said first tone and a second picture element signal representative of a picture element of said second tone that is supplied thereto in one of said addresses that is specified by the count-up pulses, said count-up pulses being resettable to specify the address corresponding to the scanning line leading end and to thereby at once produce the picture element signals memorized therein;

second line memory means having consecutively numbered addresses corresponding to the picture elements in each scanning line and specified by line memory address pulses resettable simultaneously with the reset of said count-up pulses to specify the second line memory means address corresponding to the scanning line leading end, said second line memory means being for memorizing, in response to the simultaneous reset of said count-up and said line memory address pulses, the picture element signals produced at once by said first line memory means and for successively producing, in response to said line memory address pulses, the picture element signals memorized therein as said logic pulse sequence;

state code decoding means responsive to either of a transfer completion and a state code decoding means energizing signal for decoding the state code signals representative of said first through said fourth states into first through fourth start signals, respectively, by detecting the state code signal in the band-compressed signal memorized in said buffer memory;

first run length code decoding means responsive to a first energizing signal for decoding the first run length code signal into a first binary signal representative of the first run length specified by the decoded first run length code signal by detecting the first run length code signal in the band-compressed signal memorized in said buffer memory;

second run length code decoding means responsive to a second energizing signal for decoding the second run length code signal into a second binary signal representative of the second run length specified by the decoded second run length code signal by detecting the second run length code signal in the band-compressed signal memorized in said buffer memory;

a first state decoder having a rest and an energized state, connected to said state code decoding, said second line memory, and said first run length code decoding means, and energized by said first start signal from the reset state to the energized state to successively carry out the steps of producing a count-up control signal and an address control signal while detecting a first change in said logic pulse sequence from the second picture element signal to the first picture element to suspend production of said count-up and said address control signals and to produce the first energizing signal upon detection of said first change and of producing, in response to the first binary signal produced by said first run length code decoding means in response to the last-mentioned first energizing signal, a count-down control signal for a first duration corresponding to the first run length represented by the last-mentioned first binary signal and then the first picture element signal together with the count-up control signal for said first duration while detecting a second change in said logic pulse sequence from the first picture element signal to the second picture element signal to produce said state code decoding means energizing signal and to be put into said rest state upon detection of said second change;

a second state decoder having a rest and an energized state, connected to said state code decoding, said second line memory, and said first run length code decoding means, and energized by said second start signal from the rest state into the energized state to successively carry out the steps of producing the count-up and the address control signals while detecting the first change to suspend production of the last-mentioned count-up and address control signals and to produce the first energizing signal upon detection of the last-mentioned first change and of producing, in response to the first binary signal produced by said first run length code decoding means in response to the last-mentioned first energizing signal, the first picture element signal and the count-up and the address control signals for the first duration corresponding to the first run length represented by the last-mentioned first binary signal while detecting the second change to produce said state code decoding means energizing signal to be put into the rest state upon detection of the last-mentioned second change;

a third state decoder having a rest and an energized state, connected to said state code decoding and said second line memory means, and energized by said third start signal from the rest state to the energized state to successively carry out the steps of producing the count-up and the address control signals while detecting the first change and of additionally producing the first picture element signal upon detection of the last-mentioned first change while detecting the second change to produce said state code decoding means energizing signal and to be put into the rest state upon detection of the last-mentioned second change;

a fourth state decoder having a rest and an energized state, connected to said state code decoding, said first and said second run length code decoding, and said second line memory means, and energized by said fourth start signal from the rest state into said energized state to successively carry out the steps of producing the count-up and the address control signals while detecting the first change to suspend production of the last-mentioned count-up and address control signals and to produce the second energizing signal upon detection of the last-mentioned first change, of producing, in response to the second binary signal produced by said second run length code decoding means in response to the last-mentioned second energizing signal, the count-up and the count-down control signals for a second duration corresponding to the second run length represented by the last-mentioned second binary signal and then the first energizing signal when the last-mentioned second run length is measured to the leading side of said first partial pattern from that trailing side of the second partial pattern which leads and trails the last-mentioned leading side, respectively, and of producing in response to the first binary signal produced by said first run length code decoding means in response to the last-mentioned first energizing signal, the first picture element signal and the count-up and the address control signals for the first duration corresponding to the first run length represented by the last-mentioned first binary signal while detecting the second change to produce said state code decoding means energizing signal and to be put into the rest state upon detection of the last-mentioned second change; and line memory control signal producing means responsive to said count-up, said count-down, and said address control signals for producing said count-up, said count-down, and said line memory address pulses, respectively, and producing said transfer completion signal substantially simultaneously with the reset of said count-up and said line memory address pulses.

* * * * *

UNITED STATES PATENT AND TRADEMARK OFFICE
CERTIFICATE OF CORRECTION

PATENT NO. : 4,204,232

DATED : May 20, 1980

INVENTOR(S) : Shoji MIZUNO

It is certified that error appears in the above—identified patent and that said Letters Patent is hereby corrected as shown below:

IN THE ABSTRACT

Line 5, after "side of" insert -- a -- .

IN THE SPECIFICATION

Column 1, line 19, delete "by" and insert -- be -- .

Column 7, line 46, after "Lb(2)" (first occurrence) delete "LB(3)" .

line 46, after "Lb(2)" (second occurrence) insert -- Lb(3) -- .

Column 11, line 16, delete "9" and insert -- a -- .

UNITED STATES PATENT AND TRADEMARK OFFICE
CERTIFICATE OF CORRECTION

PATENT NO. : 4,204,232
DATED : May 20, 1980
INVENTOR(S) : Shoji MIZUNO

It is certified that error appears in the above—identified patent and that said Letters Patent is hereby corrected as shown below:

<u>IN THE CLAIMS</u>

Column 14, line 27, delete "tharsversely" and insert -- transversely -- .

Column 17, line 12, delete "of" (third occurrence).

line 49, before "second" insert -- said -- .

Column 18, line 41, delete "side" and insert -- sides -- .

Signed and Sealed this

Ninth Day of December 1980

[SEAL]

Attest:

SIDNEY A. DIAMOND

Attesting Officer

Commissioner of Patents and Trademarks